(12) United States Patent
Mori et al.

(10) Patent No.: US 7,798,701 B2
(45) Date of Patent: Sep. 21, 2010

(54) DISPLAY DEVICE AND LIQUID CRYSTAL DISPLAY DEVICE

(75) Inventors: Akihiro Mori, Tokyo (JP); Takuya Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 12/142,309

(22) Filed: Jun. 19, 2008

(65) Prior Publication Data

US 2008/0316771 A1    Dec. 25, 2008

(30) Foreign Application Priority Data

Jun. 20, 2007    (JP)    ............... 2007-162417

(51) Int. Cl.
*F21V 7/04*    (2006.01)

(52) U.S. Cl. ................. 362/634; 362/633; 362/612

(58) Field of Classification Search ......... 362/632–634, 362/612, 97.1–97.4
See application file for complete search history.

(56) References Cited

U.S. PATENT DOCUMENTS

| | | | | |
|---|---|---|---|---|
| 5,857,767 A * | 1/1999 | Hochstein | .................. | 362/294 |
| 6,480,245 B1 * | 11/2002 | Sakamoto et al. | ............. | 349/59 |
| 6,593,979 B1 * | 7/2003 | Ha et al. | ...................... | 349/58 |
| 7,125,152 B2 * | 10/2006 | Lin et al. | ..................... | 362/609 |
| 2002/0093811 A1 * | 7/2002 | Chen | ........................... | 362/31 |
| 2005/0141244 A1 * | 6/2005 | Hamada et al. | ............. | 362/612 |
| 2006/0072345 A1 * | 4/2006 | Ho et al. | ..................... | 362/633 |
| 2007/0091644 A1 * | 4/2007 | Fujishima | ................... | 362/630 |
| 2007/0133222 A1 | 6/2007 | Watanabe et al. | | |
| 2007/0153548 A1 | 7/2007 | Hamada et al. | | |

FOREIGN PATENT DOCUMENTS

| | | |
|---|---|---|
| CN | 1532602 A | 9/2004 |
| CN | 1591131 A | 3/2005 |
| CN | 2896795 Y | 5/2007 |
| JP | 2002-107721 | 4/2002 |
| JP | 2005-38771 | 2/2005 |

* cited by examiner

*Primary Examiner*—Jong-Suk (James) Lee
*Assistant Examiner*—Julie A Shallenberger
(74) *Attorney, Agent, or Firm*—Oblon, Spivak, McClelland, Maier & Neustadt, L.L.P.

(57) ABSTRACT

A display device includes a point light source; a light source substrate; a rear frame including a first side wall and a bottom, the light source substrate being disposed at an inner surface of the first side wall; and a front frame engaged with the rear frame and including a second side wall that faces the first side wall. The first side wall and the second side wall respectively have a first through hole and a second through hole through which a screw is inserted. The light source substrate has a screw hole to be screwed with the screw and is located only at a position corresponding to the first through hole and the second through hole. The light source substrate is fixed by the screw that is inserted into the first through hole and the second through hole and is screwed into the screw hole.

11 Claims, 5 Drawing Sheets

DISPLAY DEVICE AND LIQUID CRYSTAL DISPLAY DEVICE

CROSS-REFERENCE TO RELATED APPLICATIONS

This application is based upon and claims the benefit of priority from Japanese Patent Application No. 2007-162417, filed on Jun. 20, 2007, the entire contents of which are incorporated herein by reference.

BACKGROUND OF THE INVENTION

1. Field

The present invention relates to a display device and a liquid crystal display device including a light source unit using a point light source.

2. Description of the Related Art

In general, a display device includes a display panel, a circuit substrate and a light source unit. The types of the light source unit for irradiating the display panel with light from the rear side of the display panel may include a side light type (also called an edge light type) in which light sources are disposed on the side face of a housing, a direct light type in which light sources are disposed on the bottom surface of a housing to oppose the display panel, etc.

The side light type light source unit may typically include a light guide plate for guiding light from the light sources to an opening of the housing. The light source unit using the light guide plate is configured to draw planar light out of the opening of the housing by propagating light emitted from line light sources such as cold cathode tubes or point light sources such as light emitting diodes (LEDs) into the light guide plate and diffusing the light with a diffusing pattern provided on the bottom and/or top of the light guide plate.

In order to increase brightness of images displayed on a screen of the light source unit using the point light sources such as LEDs, it may be considered to increase the number of point light sources such that the density of the point light sources increases, or to increase current supplied to the point light sources. In either case, the temperature at the circumference of the point light sources becomes high due to heat generated from the point light sources in light emission, which may result in decrease of emission efficiency of the point light sources and reduction of their lifetime.

JP-A-2005-38771 discloses a structure of a display device, which is capable of improving heat-radiation property and exchanging old light sources for new ones if necessary. In the display device disclosed in JP-A-2005-38771, metal with high heat radiation property or ceramics is used for an LED substrate. The LEDs as point light sources are mounted on a mounting surface of the LED substrate. The rear surface of the LED substrate, which is opposite to the mounting surface, is closely attached to the inner side face of an LED cover, and the LED cover is fitted into a display plate case for accommodating a display plate. According to this configuration, heat generated due to lighting of the LEDs is radiated as the heat is transferred from the LED substrate to the display plate case via the LED cover and a fit portion. In addition, a portion of the LED cover is exposed to the outside and thus is cooled by external air. If exhausted LEDs are to be exchanged for new ones, the LED substrate is detached and separated from the LED cover.

JP-A-2002-107721 discloses a liquid crystal display module in which a light source substrate is fixed by disposing the light source substrate to be brought into contact with a substrate support part formed at a case, and then fixing a light guide plate to the case. In this disclosed liquid crystal display module, since the light source substrate is fixed without using screws or an adhesive, it is possible to easily separate the light source substrate from the case by separating the light guide plate from the case.

However, the display device and the liquid crystal display module disclosed in JP-A-2005-38771 and JP-A-2002-107721 have a problem of reliability since they do not have a structure which is capable of sufficiently radiating heat generated from the light sources. In addition, the device or the module is necessarily disassembled for separation of the light source substrate. Particularly, after the display device or the module is mounted on electronic equipments, the operation for exchanging the light sources is complicated.

SUMMARY OF THE INVENTION

The present invention has been conceived in view of the above disadvantages, and it is an object of the invention to provide a display device, which is capable of radiating heat with high efficiency by tightly fixing a light source substrate mounted with point light sources to a housing so that heat generated from the point light sources can be transferred to the housing. It is another object of the invention to provide a display device which is capable of easily detaching/attaching and exchanging a light source substrate without disassembling a body of the display device.

According to a first aspect of the invention, there is provided a display device comprising: at least one point light source configured to emit light; a light source substrate on which the point light source is mounted; a rear frame including a first side wall and a bottom, the light source substrate being disposed at an inner surface of the first side wall; and a front frame engaged with the rear frame and including a second side wall that faces the first side wall, wherein the first side wall and the second side wall respectively have a first through hole and a second through hole through which a screw including a screw groove part and a screw head part is inserted, and wherein the light source substrate has a screw hole to be screwed with the screw groove part, the screw hole being located only at a position corresponding to the first through hole and the second through hole, such that the light source substrate is fixed by the screw that is inserted into the first through hole and the second through hole and is screwed into the screw hole.

According to a second aspect of the invention, there is provided a liquid crystal display device comprising: a display device; and a liquid crystal display panel, wherein the display device comprises: at least one point light source configured to emit light; a light source substrate on which the point light source is mounted; a rear frame including a first side wall and a bottom, the light source substrate being disposed at an inner surface of the first side wall; and a front frame engaged with the rear frame and including a second side wall that faces the first side wall, wherein the first side wall and the second side wall respectively have a first through hole and a second through hole through which a screw including a screw groove part and a screw head part is inserted, wherein the light source substrate has a screw hole to be screwed with the screw groove part, the screw hole being located only at a position corresponding to the first through hole and the second through hole, such that the light source substrate is fixed by the screw that is inserted into the first through hole and the second through hole and is screwed into the screw hole, and

DETAILED DESCRIPTION OF THE PREFERRED EMBODIMENT

Hereinafter, display devices according to embodiments of the present invention will be described with reference to the drawings. Throughout the drawings, the similar or same components are denoted by the same reference symbols.

Embodiment 1

Figure 1:
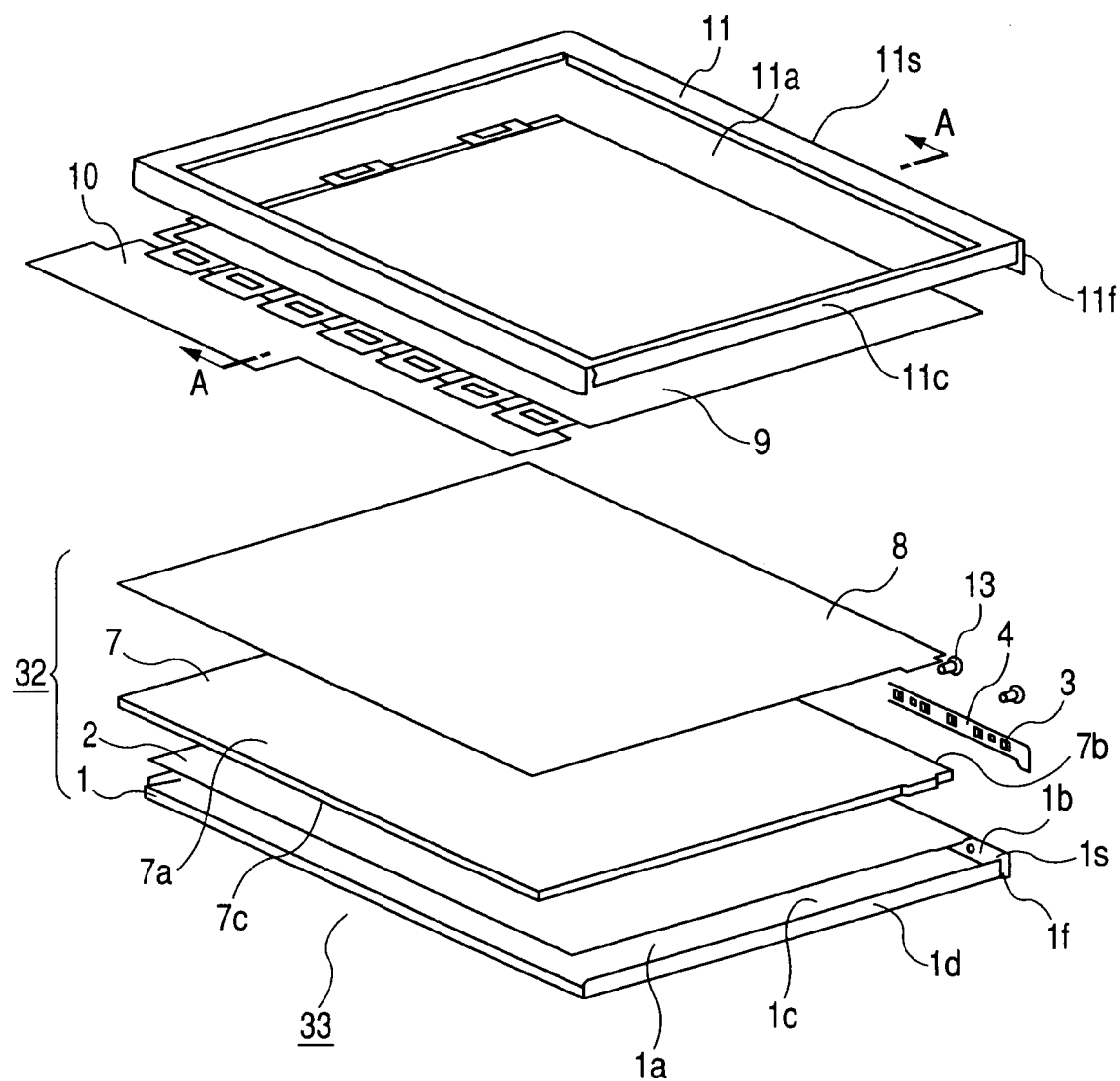
FIG. 1 is an exploded perspective view showing a general configuration of a display device according to Embodiment 1 of the present invention.
Figure 2:
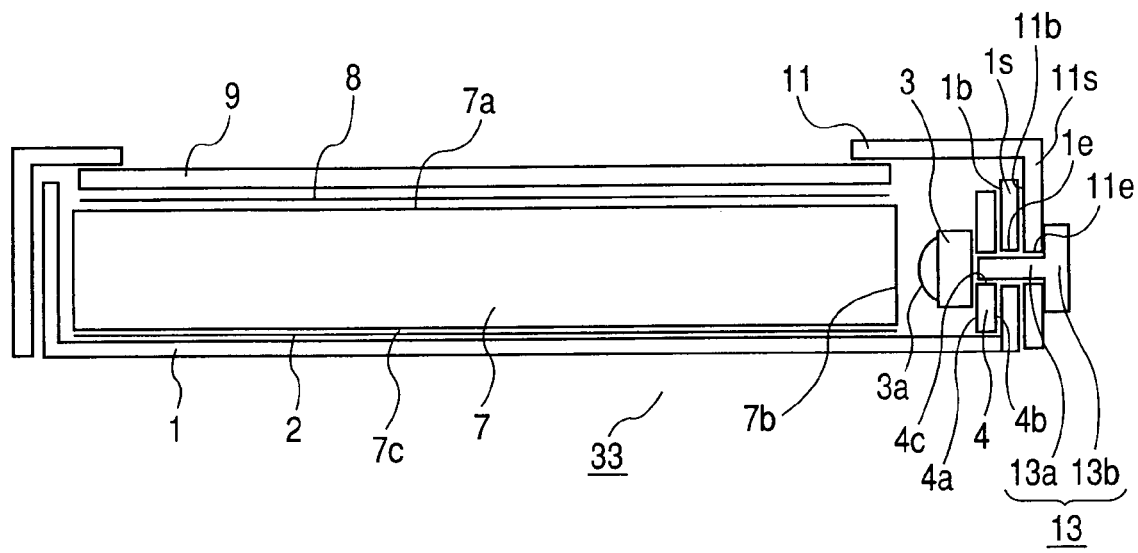
FIG. 2 is a sectional view taken along arrow A-A under a state where the display device shown in FIG. 1 is assembled.
Figure 3:
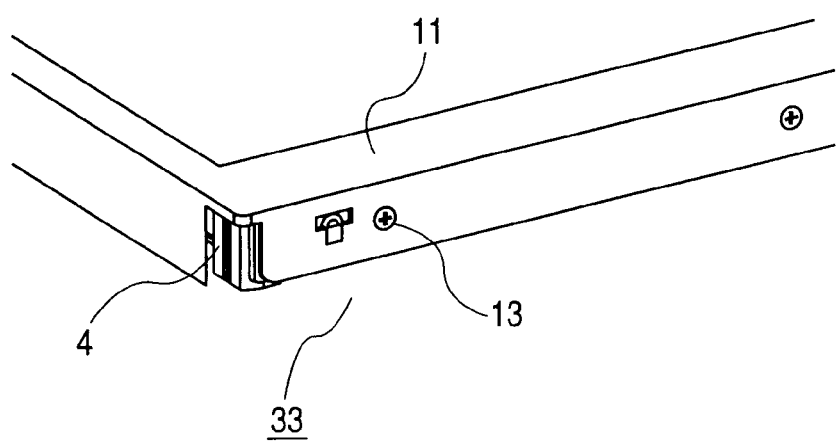
FIG. 3 is an enlarged view of a main part of the display device according to Embodiment 1 of the present invention.
Figure 4:
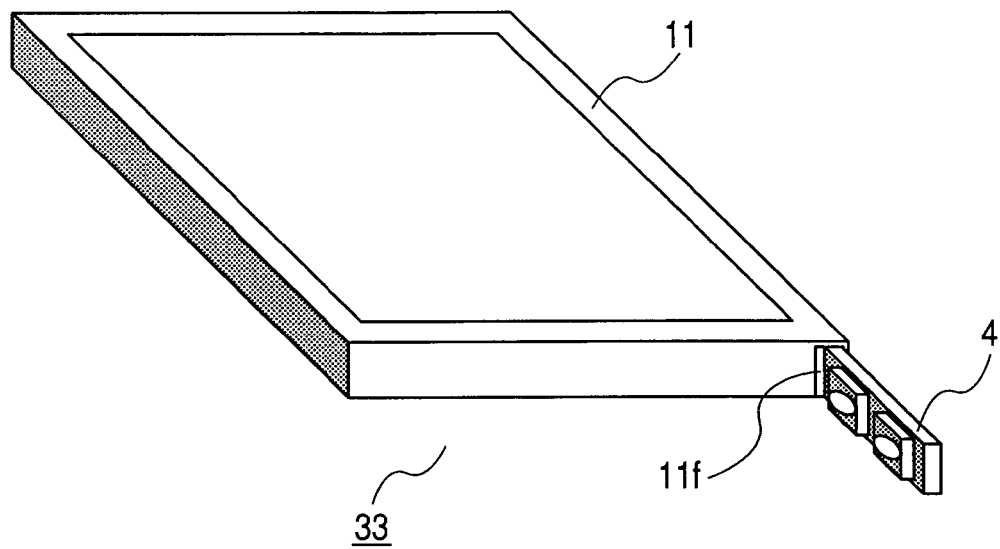
FIG. 4 is a perspective view showing the display device according to Embodiment 1 of the present invention.

FIG. 1 is an exploded perspective view showing a general configuration of a display device according to Embodiment 1 of the present invention, FIG. 2 is a sectional view taken along arrow A-A under a state where the display device shown in FIG. 1 is assembled, FIG. 3 is an enlarged view of a main part of the display device according to Embodiment 1 of the present invention, and FIG. 4 is a perspective view showing the display device according to Embodiment 1 of the present invention.

As shown in FIGS. 1 and 2, reference numeral 1 denotes a rear frame as a box-like housing including a side wall and bottom and having an opening 1a. A light source substrate 4 is a substantially rectangular plate-like substrate and is disposed on an inner surface 1b of one side wall 1s of the rear frame 1. On the light source substrate 4, point light sources 3 configured to emit light are mounted. A light guide plate 7 is disposed in the rear frame 1. The light guide plate 7 is configured to propagate light incident therein in the form of planar light and to output the planar light through an emission surface 7a. The light guide plate 7 has an incident surface 7b opposing a light emission part 3a of the point light sources 3. A reflecting sheet 2 configured to reflect the light, which is outputted from a rear surface 7c of the light guide plate 7, to the light guide plate 7 is disposed on the bottom surface 1c of the rear frame 1. One or more optical sheets 8 for obtaining desired optical characteristics are disposed on an emission surface 7a of the light guide plate 7, thereby completing a planar light source unit 32. If necessary, a middle frame (not shown) for supporting the light source substrate 4, the light guide plate 7 and so on may be disposed to be coupled to the rear frame 1. Although FIG. 1 shows a structure where one light source substrate 4 is disposed at the inner surface 1b of one side wall 1s of the rear frame 1, a plurality of light source substrates 4 may be disposed at a plurality of inner surfaces 1b. A display device 33 is assembled by providing a display panel 9, such as a liquid crystal display panel, and a circuit board 10 configured to drive and control the display panel 9 on the planar light source unit 32, and fitting the planar light source unit 32 into a front frame 11 as a housing having an opening 11a. As the display panel 9, a transmissive resin plate having no driving circuit may be disposed. Although the planar light source unit 32 having the light guide plate 7 has been described in the above discussion, a hollow planar light source unit 32 without using the light guide plate 7 may be employed.

The point light sources 3 mounted on the light source substrate 4 include LEDs or the like for emitting red, green, blue, white or neutral color. One or more point light sources 3 may be mounted on the light source substrate 4 by soldering or other suitable means. If a plurality of point light sources 3 is disposed, they may be mounted with colors selected or in combination thereof according to their use. Gaps or arrangement positions between the point light sources 4 may be properly set according to their use or purpose. In this embodiment, a plurality of point light sources 3 are substantially linearly mounted on the light source substrate 4 with equal intervals.

As shown in FIGS. 2 and 3, a screw 13 includes: a screw groove part 13a with screw grooves formed on a cylindrical member; and a screw head part 13b formed to have a diameter larger than the screw groove part 13a. The light source substrate 4 has a screw hole 4c configured to be screwed with the screw groove part 13a from a rear surface 4b to the mounting surface 4a. The rear surface 4b is opposite to a mounting surface 4a. The light source substrate 4 is fixed to the display device 33 through the screw 13. Holes 1e and 11e for insertion of the screw 13 are respectively provided at the side wall 1s of the rear frame 1 and the side wall 11s of the front frame 11. In the rear frame 1, the light source substrate 4 is disposed. The side wall 11s of the front frame 11 opposes the side wall 1s of the rear frame 1 in which the light source substrate 4 is disposed. When the light source substrate 4 is fixed, the screw groove part 13a of the screw 13 is inserted into the hole 11e of the front frame 11 and the hole 1e of the rear frame 1 and is screwed into the screw hole 4c of the light source substrate 4. In this manner, by fixing the light source substrate 4 from the rear surface 4b with the screw 13, the light source substrate 4 can be reliably and tightly attached and fixed to the inner surface 1b of the rear frame 1. Accordingly, by transferring heat generated by the point light sources 3 to the rear frame 1 and the front frame 11, efficient heat radiation can be achieved. In addition, since the light source substrate 4 is tightly attached and fixed to the rear frame 1, misalignment of the light source substrate 4 can be prevented. Therefore, it is possible to prevent the point light sources 3 from being damaged by contacting with the light guide plate 7 and so on. Although the rear frame 1 and the front frame 11 may be made of plastic resin, they may be made of metal having high thermal conductivity such as aluminum, stainless steel, iron, copper or the like, or material including such metal in order to raise the heat radiation efficiency.

In addition, as shown in FIG. 1, the display device 33 has openings 1f and 11f respectively formed at side walls 1d and 11c of the rear frame 1 and the front frame 11. The side walls 1d and 11c are respectively provided substantially perpendicular to the side walls 1s and 11s on which the light source substrate 4 is disposed. The openings 1f and 11f correspond to positions at which the light source substrate 4 of the side walls 1d and 11c is disposed. As shown in FIG. 4, if the light source substrate 4 needs to be attached/detached and exchanged, the light source substrate 4 can be easily attached/detached and exchanged by releasing the screw 13 for fixing the light source substrate 4 and sliding and inserting/extracting the light source substrate 4 along the inner surface 1b of the rear frame 1 through the openings 1f and 11f.

As described above, in the present embodiment, the through holes 1e and 11e for insertion of the screw 13 are respectively provided at the side walls 1s and 11s of the rear frame 1 and the front frame 11, and the screw 13 is inserted into the through holes 1e and 11e and is screwed into the screw hole 4c of the light source substrate 4 from the rear surface 4b. Accordingly, since the light source substrate 4 can be attached and fixed to the inner surface 1b of the rear frame 1, by transferring heat generated by the point light sources to the rear frame 1 and the front frame 11, efficient heat radiation can be achieved. In addition, as the light source substrate 4 is reliably and fixed to the rear frame 1, it is possible to prevent the point light sources 3 from being damaged by contact with the light guide plate 7 and so on. In addition, in a state where the display device 33 is assembled, by forming the openings 1f and 11f into/from which the light source substrate 4 can be inserted/extracted in the side walls 1d and 11c of the front frame 11 and the rear frame 1, attaching/detaching the screw 13 for fixing the light source substrate 4 and inserting/extracting the light source substrate 4 into/from the openings 1f and 11f, it is possible to easily attaching/detaching and exchanging the light source substrate 4 without disassembling the display device 33.

In addition, the light source substrate 4 includes an insulating layer (not shown) provided on a metal base substrate or a ceramic base substrate and a circuit pattern (not shown) provided on the insulating layer for supplying power to the point light sources 3. The metal or ceramic base substrate of the light source substrate 4 may be bonded to a flexible printed circuit board (FPC) or a resin board. As described above, when the base substrate is made of ceramics, the light source substrate 1 has high strength and it is possible to efficiently radiate heat from the point light sources 3. When the base substrate is made of metal, the screw groove part 13a is apt to be machined and it is possible to efficiently radiate heat from the point light sources 3. Example of metal used may include aluminum, stainless steel, iron, copper, etc. In the light source substrate 4, the screw holes are formed at the base substrate.

Figure 5:
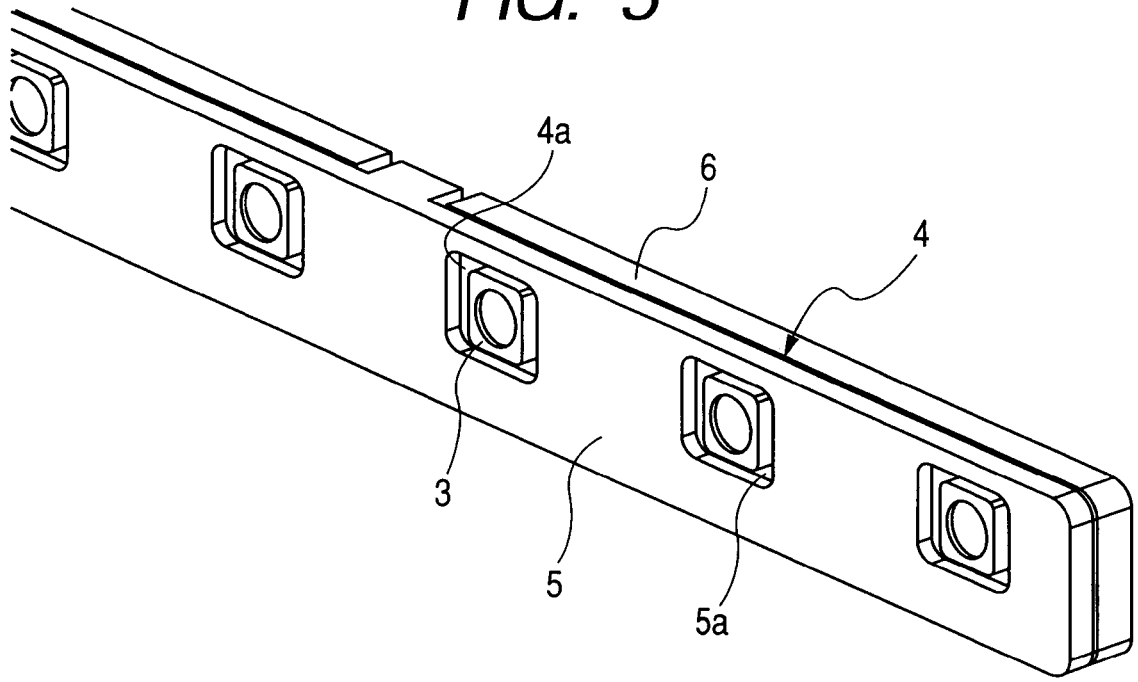
FIG. 5 is an enlarged view of a main part of a modification of Embodiment 1 of the present invention.

FIG. 5 shows a modification of Embodiment 1 of the present invention. As shown in FIG. 5, a light source substrate cover 5 may be provided on the mounting surface 4a of the light source substrate 4. The light source substrate cover 5 is provided with through holes 5a at positions where the point light sources 3 on the light source substrate 4 are disposed, thereby protecting the light source substrate 4. The through holes 5a may be of a cut-out shape. Screw holes (not shown) are formed at the light source substrate cover 5 at positions corresponding to the screw holes 4c of the light source substrate 4. By screwing the screws 13 into the screw holes, it is possible to more tightly fixing the light source substrate cover 5 to the light source substrate 4. A supporting member 6 may be disposed on a surface opposite to the mounting surface 4a of the light source substrate 4, such that the light source substrate 4 is sandwiched between the light source substrate cover 5 and the supporting member 6. The light source substrate cover 5 may be made of plastics, metal, or material including metal. The light source substrate cover 5 may be formed with a single member or a combination of plural members if necessary. A surface of the light source substrate cover 5 is preferably formed with a reflecting member having high reflectivity such as a white mirror and the like in order to direct light, which is emitted from the point light sources 3, to the light guide plate 7.

Embodiment 2

Figure 6:
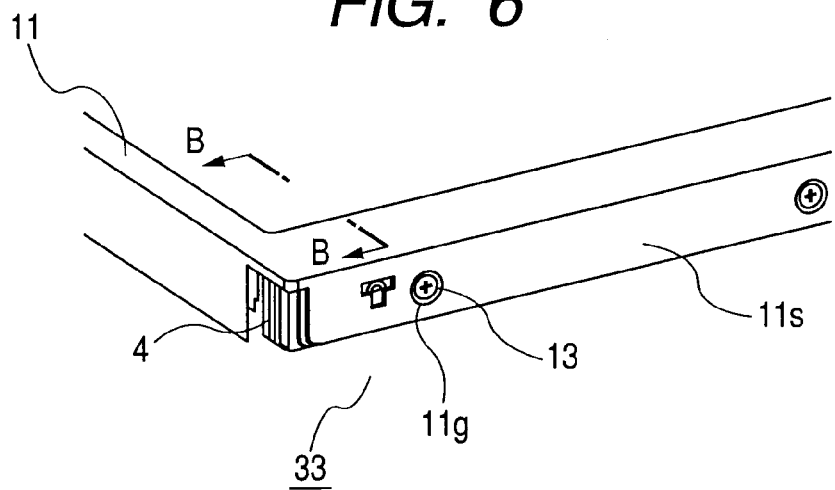
FIG. 6 is an enlarged view of a main part of a light source unit according to Embodiment 2 of the present invention.
Figure 7:
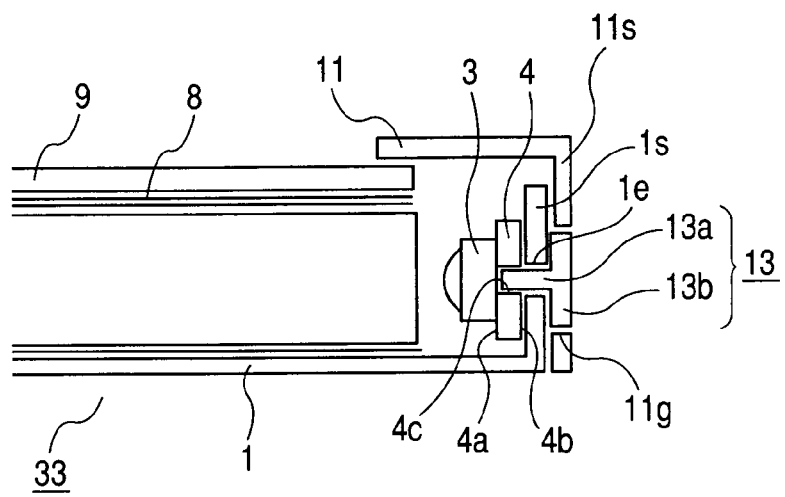
FIG. 7 is a sectional view of the display device, taken along arrow B-B in FIG. 6.

FIG. 6 is an enlarged view of a main part of a display device according to Embodiment 2 of the present invention, and FIG. 7 is a sectional view of the display device, taken along arrow B-B in FIG. 6. In Embodiment 1 the through holes 1e and 11e for insertion of the screw groove part 13a of the screw 13 is provided at the positions of the rear frame 1 and the front frame 11 where the screw hole 4c of the light source substrate 4 is formed. In Embodiment 2, a through hole 11g configured to receive the screw head part 13b of the screw 13 is provided at the front frame 11. Embodiment 2 has the same configuration as Embodiment 1 except that the through hole 11g configured to receive the screw head part 13b of the screw 13 is provided at the front frame 11.

As shown in FIGS. 6 and 7, the through hole 11g formed at the front frame 11 has a size larger than a diameter of the screw head part 13b so that the through hole 11g can receive the screw head part 13b of the screw 13. The shape of the through hole 11g is typically circular, which is similar to the screw head part 13b. The purpose of the shape of the through hole 11g is to receive the screw head part 13b in the front frame 11, but is not particularly limited. With this configuration, since the screw head part 13b of the screw 13 does not project or less projects from the side wall 11s of the front frame 11, it is possible to prevent the screw head part 13b from interfering with other parts disposed at the outside and realize a narrow frame. When the front frame 11 is to be separated from the display device 33, there is no need for work to release the screw 13, thereby improving workability.

Figure 8:
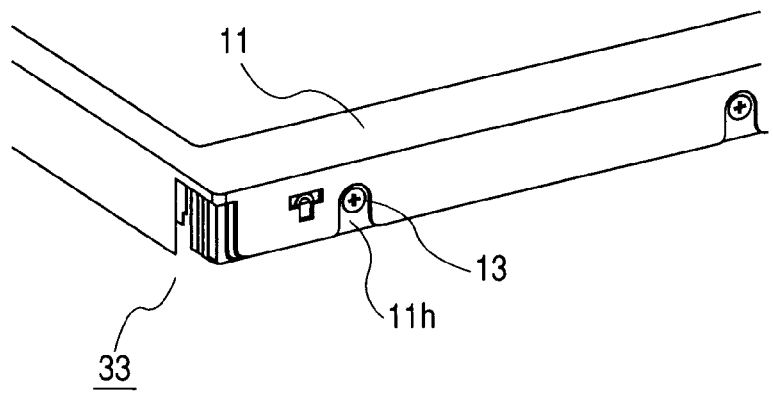
FIG. 8 is an enlarged view of a main part of a modification of the display device according to Embodiment 2 of the present invention.

FIG. 8 is an enlarged view of a main part of a modification of Embodiment 2. As shown in FIG. 8, the through hole formed at the front frame 11 may have a cut-out shape 11h in order to avoid interference with the screw head part 13b of the screw 13.

Embodiment 3

Figure 9:
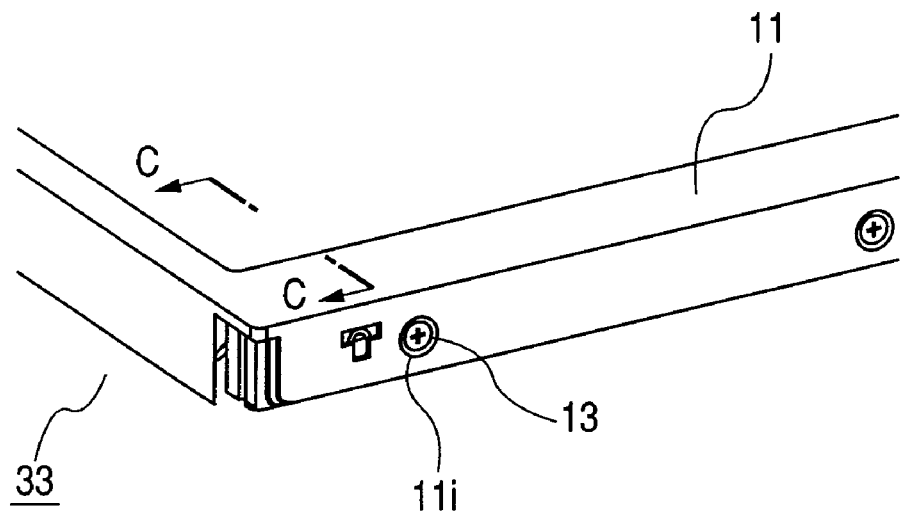
FIG. 9 is an enlarged view of a main part of a display device according to Embodiment 3 of the present invention.
Figure 10:
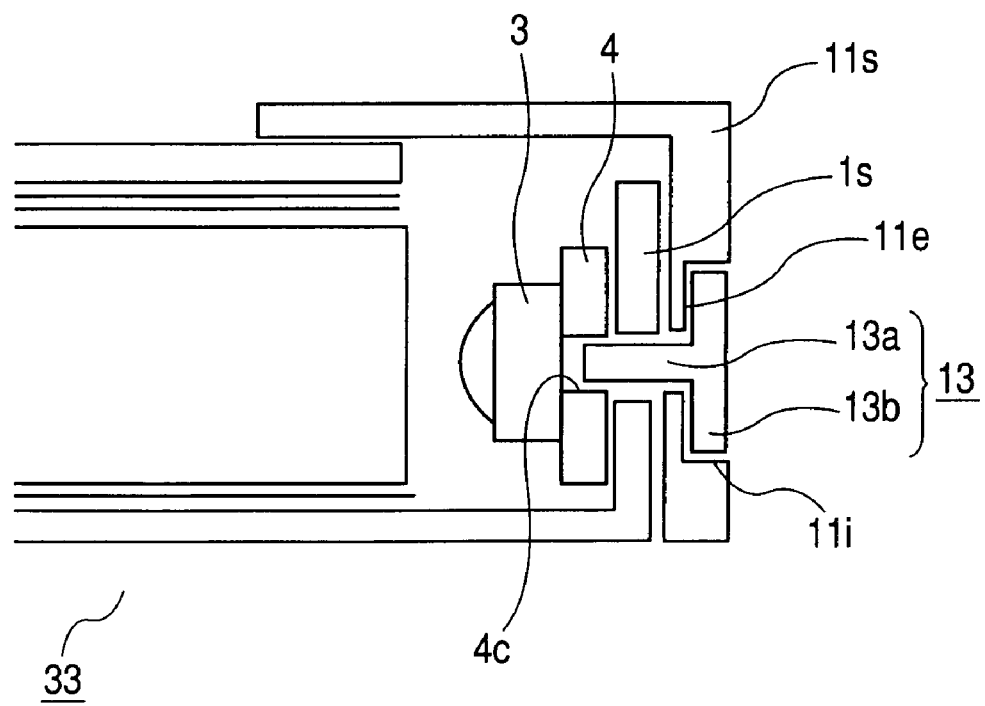
FIG. 10 is a sectional view of the display device, taken along arrow C-C in FIG. 9.

FIG. 9 is an enlarged view of a main part of a display device according to Embodiment 3 of the present invention, and FIG. 10 is a sectional view of the display device, taken along arrow C-C in FIG. 9. Although in Embodiment 2 the through holes 11g configured to receive the screw head part 13b of the screw 13 is provided at the front frame 11, a through hole 11i having a step configured to receive the screw head part 13b and allowing insertion of the screw groove part 13a is provided at the front frame 11 in Embodiment 3. Embodiment 3 has the same configuration as Embodiments 1 and 2 except that the through hole 11i having the step is provided.

As shown in FIGS. 9 and 10, the through hole 11i is formed at the side wall 11s of the front frame 11. The through hole 11i has the step configured to allow insertion of the screw groove part 13a of the screw 13 and receive the screw head part 13b. A portion in which the screw head part 13b is received has a size larger than a diameter of the screw head part 13b. The shape of the through hole 11i is typically circular, which is similar to the screw head part 13b, but is not particularly limited as long as it can receive the screw head part 13b, and may be formed by any suitable machining. With the structure where the through hole 11i having the step is provided at the side wall 11s of the front frame 11, the light source substrate 4 can be reliably fixed to the rear frame 1, and the front frame 11 can be tightly fixed to the rear frame 1 without the screw head part 13b projecting from the side wall 11s of the front frame 11, thereby increasing the overall strength of the display device.

What is claimed is:

1. A display device comprising:
   at least one point light source configured to emit light;
   an elongated light source substrate on which the point light source is mounted;
   a rear frame including a first side wall extending parallel to the direction of elongation of the light source substrate, and a bottom, the light source substrate being disposed at an inner surface of the first side wall; and
   a front frame engaged with the rear frame and including a second side wall that faces the first side wall,
   wherein the first side wall and the second side wall respectively have a first through hole and a second through hole through which a screw including a screw groove part and a screw head part is inserted, and
   wherein the light source substrate has a screw hole on a rear surface of the mounting surface of the point light source to be screwed with the screw groove part, the screw hole being located only at a position corresponding to the first through hole and the second through hole, such that the light source substrate is pressed into contact with the first side wall and fixed by the screw that is inserted into the first through hole and the second through hole and is screwed into the screw hole.

2. A display device comprising:
   at least one point light source configured to emit light;
   a light source substrate on which the point light source is mounted;
   a rear frame including a first side wall and a bottom, the light source substrate being disposed at an inner surface of the first side wall; and
   a front frame engaged with the rear frame and including a second side wall that faces the first side wall,
   wherein the first side wall and the second side wall respectively have a first through hole and a second through hole through which a screw including a screw groove part and a screw head part is inserted, and
   wherein the light source substrate has a screw hole to be screwed with the screw groove part, the screw hole being located only at a position corresponding to the first through hole and the second through hole, such that the light source substrate is fixed by the screw that is inserted into the first through hole and the second through hole and is screwed into the screw hole,
   wherein the rear frame includes a third side wall substantially perpendicular to the first side wall, the third side wall having a first opening,
   wherein the front frame includes a fourth side wall substantially perpendicular to the second side wall, the fourth side wall having a second opening,
   wherein the first opening and the second opening are located at a position corresponding to a position where the light source substrate is disposed, and
   wherein the light source substrate can be inserted into and extracted from the display device through the first opening and the second opening by sliding the light source substrate along the inner surface of the rear frame when the screw is dismounted from the light source substrate.

3. The display device according to claim 1, wherein the screw groove part is inserted into the first through hole and the second through hole.

4. The display device according to claim 1, wherein the screw head part is received in the second through hole of the front frame.

5. The display device according to claim 1, wherein the second through hole of the front frame has a step configured to receive the screw head part, and the screw groove part is inserted into the second through hole.

6. The display device according to claim 1, wherein the second through hole has a cut-out shape to avoid interference with the screw head part.

7. The display device according to claim 1, wherein the light source substrate includes an insulating layer and a circuit pattern, which are formed on a base substrate having the screw hole, and the base substrate is made of metal.

8. The display device according to claim 1, wherein the light source substrate is formed by bonding a metal or ceramic base substrate having the screw hole to a flexible board or a resin board.

9. The display device according to claim 1, further comprising a light guide plate configured to propagate light from the at least one point light source toward an inside of the rear frame in a form of planar light.

10. The display device according to claim 1, wherein the point light source is a light emitting diode.

11. A liquid crystal display device comprising:
    a display device; and
    a liquid crystal display panel,
    wherein the display device comprises:
    at least one point light source configured to emit light;
    an elongated light source substrate on which the point light source is mounted;
    a rear frame including a first side wall extending parallel to the direction of elongation of the light source substrate, and a bottom, the light source substrate being disposed at an inner surface of the first side wall; and
    a front frame engaged with the rear frame and including a second side wall that faces the first side wall,
    wherein the first side wall and the second side wall respectively have a first through hole and a second through hole through which a screw including a screw groove part and a screw head part is inserted,
    wherein the light source substrate has a screw hole on a rear surface of the mounting surface of the point light source to be screwed with the screw groove part, the screw hole being located only at a position corresponding to the first through hole and the second through hole, such that the light source substrate is pressed into contact with the first side wall and fixed by the screw that is inserted into the first through hole and the second through hole and is screwed into the screw hole, and
    wherein the liquid crystal display panel is provided at a position opposing to the bottom of the rear frame.

* * * * *